N. B. MILLER.
MOUSETRAP.
APPLICATION FILED JUNE 10, 1919.

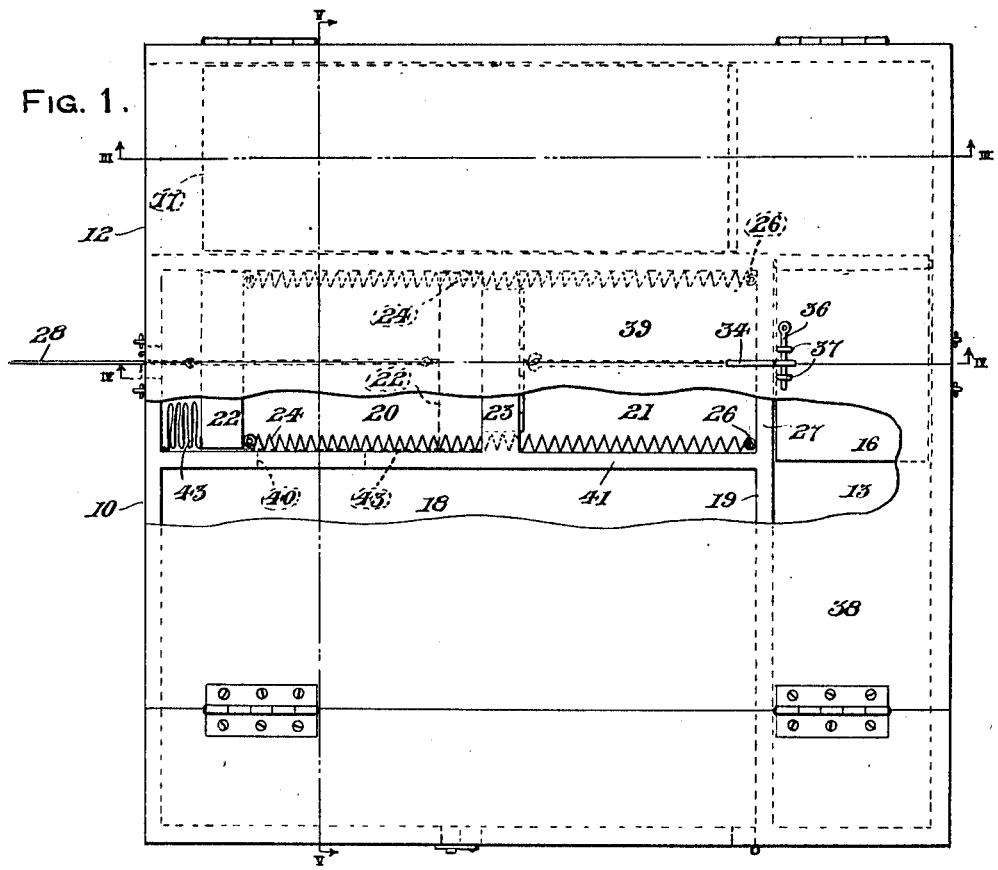
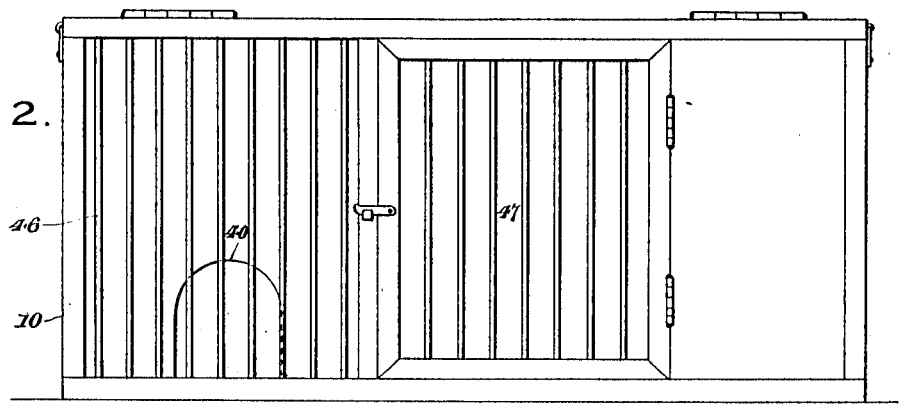

1,314,200.

Patented Aug. 26, 1919.
2 SHEETS—SHEET 2.

Inventor
N. B. Miller

By N. M. Wilson
Attorney

UNITED STATES PATENT OFFICE.

NICK B. MILLER, OF FAIRFORD, MANITOBA, CANADA.

MOUSETRAP.

1,314,200.   Specification of Letters Patent.   Patented Aug. 26, 1919.

Application filed June 10, 1919. Serial No. 303,010.

*To all whom it may concern:*

Be it known that I, NICK B. MILLER, a citizen of Ukraine, residing at Fairford, in the Province of Manitoba and Dominion of Canada, have invented certain new and useful Improvements in Mousetraps, of which the following is a specification.

The primary object of the invention is the provision of a simple and inexpensive trap adapted for catching and imprisoning small animals such as mice, the animals being readily killed by means provided in the trap whenever desired, and then easily removed from the trap.

A further object of the invention is to provide a mouse trap in which the animal is executed subsequent to capture and is then readily removed from the trap which is ready to catch another mouse while the killing means is reset at will.

A still further object of the invention is to provide a trap at all times in position for catching a mouse and readily manipulated from without for liberating the live mouse or for killing it at will.

With these general objects in view, the invention consists of the novel combination and construction of the parts hereinafter more fully described in connection with the accompanying drawings and in which like designating characters refer to corresponding parts throughout the several views.

In the drawing,

Figure 1 is a top plan view of the invention partially broken away,

Fig. 2 is a front elevation thereof, and

Figure 3:
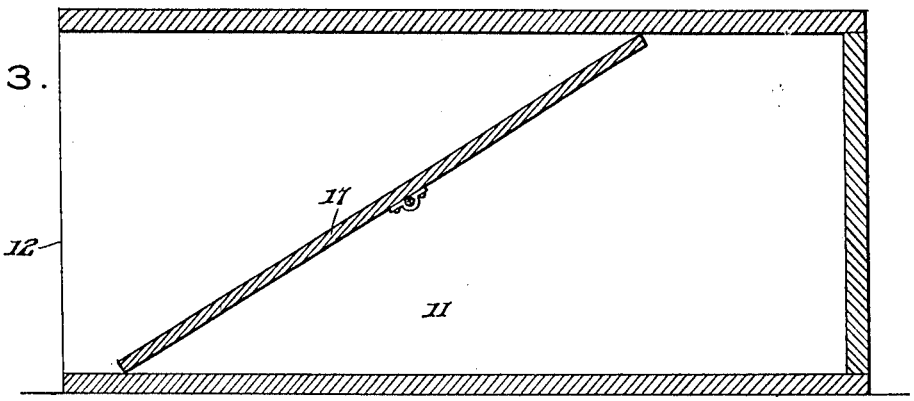
Figs. 3, 4 and 5 are vertical sectional views taken upon lines III—III, IV—IV and V—V respectively of Fig. 1.

My invention comprises a rectangular casing 10 having an entrance runway 11 in one end thereof with an open mouth 12 at one side of the casing. A similar runway 13 at the side of the casing opposite the mouth 12 is entered by the mouse from the runway 11 by passing through an opening 14 in the partition 15, a swinging flap 16 permitting the mouse to pass inwardly through the opening 14 but preventing its return to the runway 11.

A usual form of pivoted platform 17 in the runway 11 is normally tilted downwardly toward the mouth 12 permitting the mouse to travel over the platform 17 inwardly of the runway.

An imprisoning compartment 18 at the forward side of the casing 10 receives the mouse from the runway 13 beneath a short length partition 19 between the compartment 18 and runway 13. The space between the compartment 18 and runway 11 is divided into a killing chamber 20 and a discharge chamber 21. A plug 22 in the chamber 20 is pulled toward and into contact with the partition 23 between the chambers 20 and 21 by means of helical springs 24 attached adjacent the corners of the block 22, passing through openings 25 in the partition 23 and anchored at 26 to the adjacent partition wall 27 of the runway 13.

Figure 4:
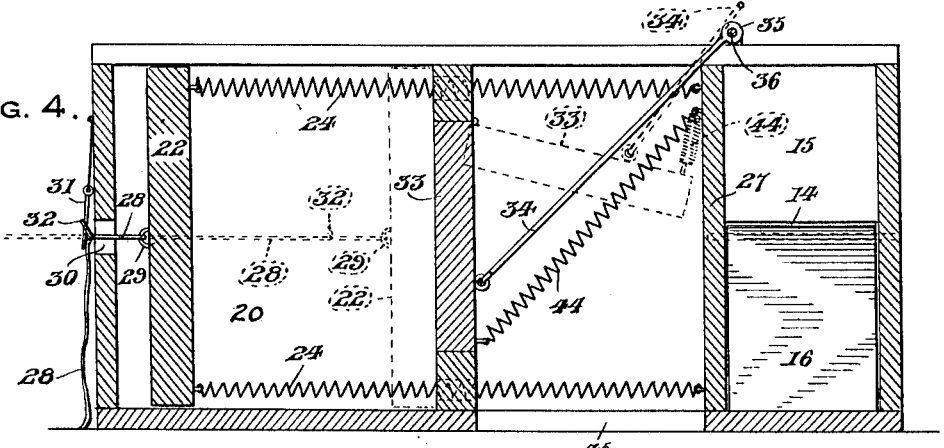
Figure 5:
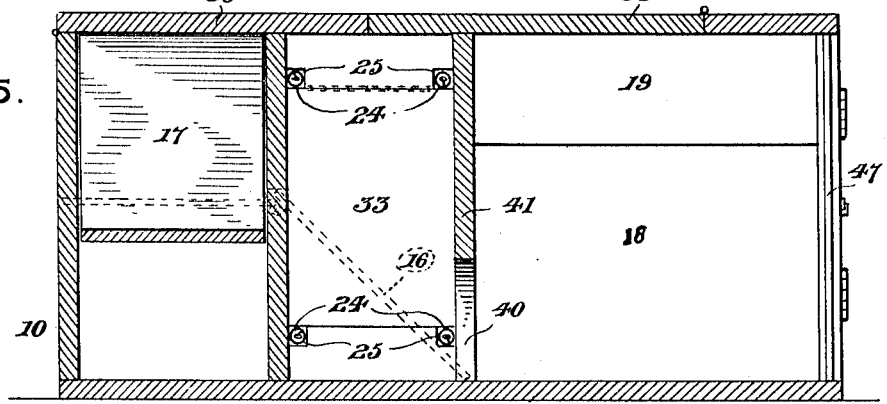

The block 22 is normally held retracted against the tension of the springs 24 by a cord 28 centrally attached as at 29 to the block and passing through a perforation 30 in the adjacent side of the casing 10 and held in any convenient manner as by a pin 31 passing through a loop 32 of the cord 28. A hinged door 33 in the partition 23 is held closed when the trap is set by a rod 34 pivoted to said door and extending through the top of the casing 10 with a loop 35 adapted for receiving a pin 36 which pin also passes through eyes 37 upon the top of the casing. Two hinged lids 38 and 39 at the top of the casing 10 permit ready access to the interior thereof. The trap is set by retracting the block 22 and securing the same in its retracted position by the cord 28 as illustrated in Fig. 4 of the drawings, while the door 33 is locked closed by the rod 34. The mouse passes inwardly through the mouth 12 and through the runways 11 and 13 into the compartment 18 and thence through an opening 40 in the side wall 41 of the compartment into the killing chamber 20 between the block 22 and the partition 23. The pin 31 may then be removed for releasing the cord 28, permitting the springs 20 to forcibly move the block 22 and killing the mouse between the block 22 and partition 23. A flexible curtain 43 preferably composed of leather is positioned on said block 22 connected with the adjacent side of the casing 10, which curtain closes the opening 40 when the block 22 moves toward the partition 23, thereby preventing another mouse from entering the chamber 20 rearwardly of the block 22 and between the block and the adjacent side of the casing.

Upon killing the mouse in the chamber 20 the pin 36 is released and a spring 44 secured between the door 33 and the partition 27 automatically elevates the door 33 to its open position. An opening 45 at the bottom of the discharge chamber 21 permits the dead mouse to be readily removed from the trap as the continued movement of the block 22 by means of the cord 28 and springs 24 forces the mouse into the bottomless chamber 21.

The invention will be fully described as well as the operation thereof from this detailed description and it will be noted that minor details of construction may be made in different elements of the invention without departing from the spirit and scope of the invention as set forth in the claims.

The front wall of the compartment 18 is preferably provided with a grating 26, as well as a normally closed gate 47 by means of which visual access may be gained to the interior of the casing 10 without opening the lids 38 and 39 or permitting the entrapped animal to escape.

What I claim as new and desire to secure by Letters Patent is:—

1. A trap comprising a casing having an imprisoning compartment and adjacently positioned killing and discharge chambers, the killing chamber communicating with said compartment and the discharge chamber having an open bottom, a reciprocating killing block within the killing chamber and means for effecting communication between the killing and discharge chambers.

2. A trap comprising a casing having a compartment therein, exit-preventing entrance means for said compartment, an inner partition at one side of the compartment with the casing provided with spaced chambers at the opposite side of said partition, a transverse wall in said chambers having an opening therethrough, a closure door for said opening, a spring-pressed block in the portion of the chamber at one side of said wall, the said partition having an opening between said compartment and the adjacent chamber portion and means for retracting said block.

3. In combination with a casing having communicating runways upon two sides thereof, one of the same opening exteriorly of the casing, the casing also having a compartment freely communicating with the other runway, the said compartment having an inner partition provided with an opening therethrough, a transverse wall between said partition and the adjacent side of the runway having the entrance opening, the said wall forming killing and discharge chambers at opposite sides thereof, the casing being provided with an opening at the bottom of said discharge chamber, and a hinged opening door in the said wall.

4. In combination with a casing having communicating runways upon two sides thereof, one of the same opening exteriorly of the casing, the casing also having a compartment freely communicating with the other runway, the said compartment having an inner partition provided with an opening therethrough, a transverse wall between said partition and the adjacent side of the runway having the entrance opening, the said wall forming killing and discharge chambers at opposite sides thereof, the casing being provided with an opening at the bottom of said discharge chamber, a hinged opening door in said wall, a spring-pressed killing block within the killing chamber adapted for movement toward and from said wall, resilient operating means for said block and means for retracting said block at the opposite side of said partition opening from said wall permitting entrance from the compartment to a point between said block and wall.

5. In combination with a casing having communicating runways upon two sides thereof, one of the same opening exteriorly of the casing, the casing also having a compartment freely communicating with the other runway, the said compartment having an inner partition provided with an opening therethrough, a transverse wall between said partition and the adjacent side of the runway having the entrance opening, the said wall forming killing and discharge chambers at opposite sides thereof, the casing being provided with an opening at the bottom of said discharge chamber, a hinged opening door in said wall, a spring-pressed killing block within the killing chamber adapted for movement toward and from said wall, resilient operating means for said block, means for retracting said block at the opposite side of said partition opening from said wall permitting entrance from the compartment to a point between said block and wall, a flexible curtain connected between the rear of the block and the adjacent wall of the casing adapted for closing over said opening during the killing operation of the block, retaining means for the door and automatic opening means therefor when released.

6. A trap comprising a casing having a bottom opening and a side entrance opening adapted for the reception of animals, partition members within the casing surrounding the bottom opening, one of said partition members having an opening therethrough, a door in said opening, closing means for the door, locking means for the closure means when the door is closed, and automatic opening means for the door operable upon the release of said locking means.

7. A trap comprising a casing having a bottom opening and a side entrance opening adapted for the reception of animals, partition members within the casing surrounding the bottom opening, one of said partition members having an opening therethrough, a door in said opening, closing means for the door, locking means for the closure means when the door is closed, automatic opening means for the door operable upon the release of said locking means, further partitions in the casing providing a chamber adjacent said opening and adapted to receive an animal, a spring-operated killing block in said chamber outwardly of the opening and door adapted for movement toward and from the same and manual retracting means for said block.

In testimony whereof I affix my signature.

NICK B. MILLER.

Copies of this patent may be obtained for five cents each, by addressing the "Commissioner of Patents, Washington, D. C."